Nov. 1, 1960   J. M. DAVIS ET AL   2,958,753
DIE SET FOR FORMING CUTTER BLADES
Original Filed May 18, 1956   2 Sheets-Sheet 1
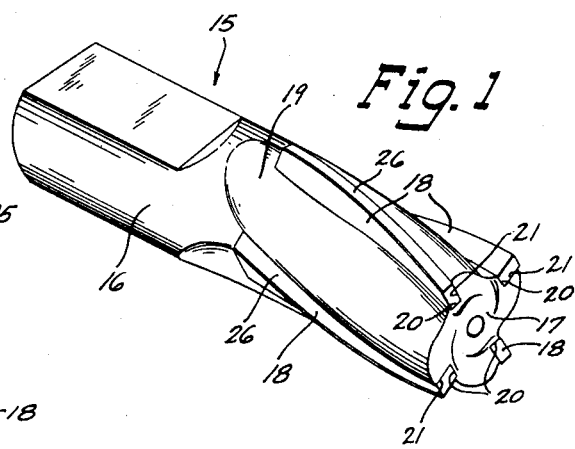
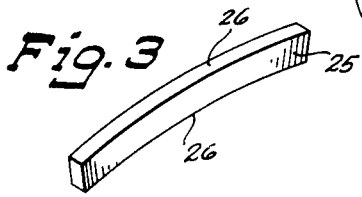
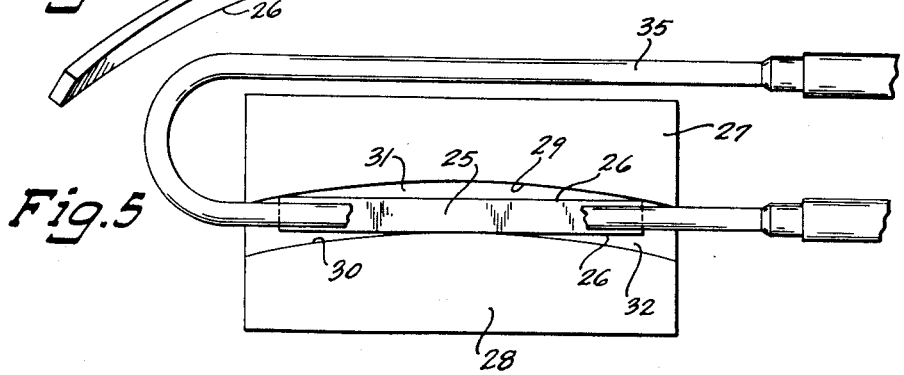
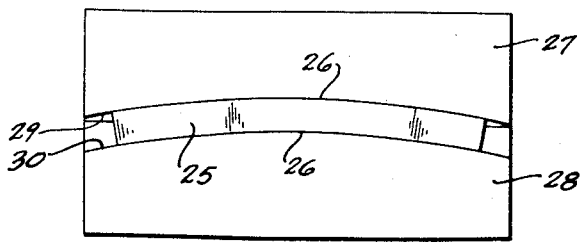
INVENTORS
Jacob M. Davis,
BY Gordon H. Hochmuth
*Attorney*

Nov. 1, 1960  J. M. DAVIS ET AL  2,958,753
DIE SET FOR FORMING CUTTER BLADES
Original Filed May 18, 1956  2 Sheets-Sheet 2
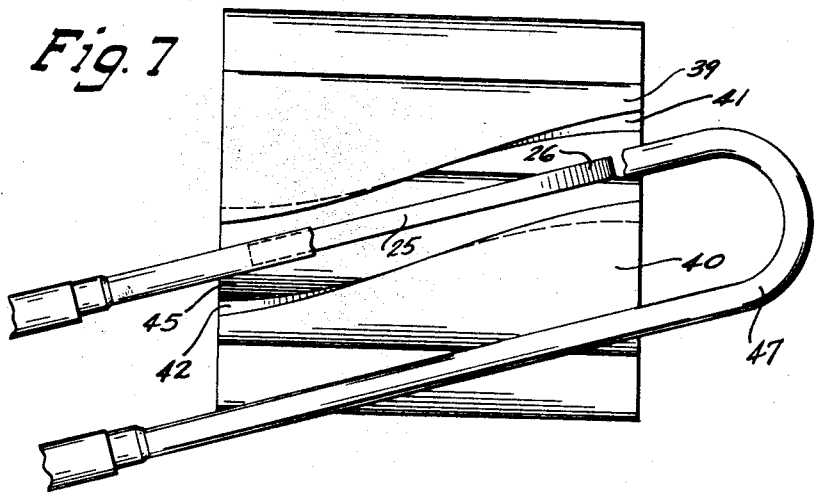
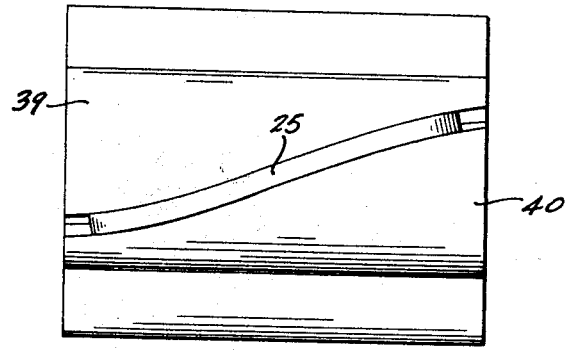
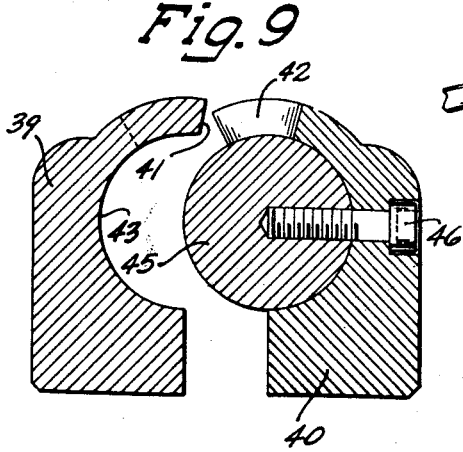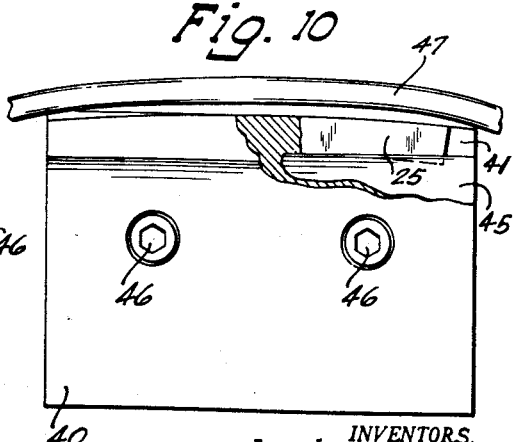
INVENTORS.
Jacob M. Davis,
BY Gordon H. Hochmuth
Attorney United States Patent Office 2,958,753
Patented Nov. 1, 1960

2,958,753
DIE SET FOR FORMING CUTTER BLADES

Jacob M. Davis, Milwaukee, and Gordon H. Hochmuth, West Allis, Wis., assignors to Kearney & Trecker Corporation, West Allis, Wis., a corporation of Wisconsin Original application May 18, 1956, Ser. No. 585,829, now Patent No. 2,903,569, dated Sept. 8, 1959. Divided and this application June 29, 1959, Ser. No. 823,661

9 Claims. (Cl. 219—7.5)

This invention relates generally to a die set for forming complex curvatures, and more particularly to an improved die set which is especially adapted for forming spiral sintered carbide cutter blades for attachment to a cutter body. This patent application constitutes a division of our U.S. Patent 2,903,569, dated September 8, 1959, entitled Method of Forming Spiral Blades.

Sintered carbide is an extremely hard and very strong material that is recognized as an ideal cutting material for metal cutting tools which enables many material removing operations to be performed very efficiently. The physical properties of sintered carbide which render it particularly well adapted for cutting metals and other materials also cause it to be difficult to work into complex configurations. For this reason it was originally impractical to produce a curved carbide cutter surface and the use of sintered carbide for cutting tools was originally confined to tools that present a flat cutting surface, such as face mills, lathe tool bits and other similar structures. In these applications it has been the practice to braze a relatively small piece of sintered carbide material to a cutter tooth or body or to provide a straight elongated carbide blade at an angle to the axis of the cutter body to form the cutting surface. More recently new methods of forming spiral carbide cutter blades have been developed and such blades are now available for attachment to cutting tools which require a curved cutting surface, such as end mills, shell mills, reamers and the like. However, the spiral carbide cutter blades presently available are not entirely satisfactory inasmuch as they are considerably more expensive than a straight carbide cutter blade of comparable size and they are not uniformly accurate. A limited amount of inaccuracy in the blade can be tolerated but it further increases the cost of the cutting tool because, as the inaccuracy of the blade increases, the amount of grinding required after the blades have been secured to the tool body likewise increases in order to produce the proper cutting surfaces. Furthermore, as the inaccuracy of the blade increases the rigidity of its mounting decreases by reason of its lack of proper engagement with the supporting surface of the cutter body.

It is therefore a general object of the present invention to provide an improved set of dies for shaping blanks into curved blades.

Another object of the present invention is to provide an improved die set for producing spiral carbide cutter blades.

Another object is to provide a die set for forming spiral carbide cutter blades of superior and uniform accuracy without producing scale on the surface of the blade.

Another object is to provide a set of dies for forming spiral carbide cutter blades that will produce blades requiring a minimum amount of grinding to produce the proper cutting surface after the blades have been secured to a tool body.

Another object is to provide a die set of simple and inexpensive construction for forming the complex configuration of spiral carbide cutter blades with uniform and superior accuracy.

Spiral cutter blades for attachment to a cutting tool body require two distinct curvatures, one of which is the edgewise camber of the blade to accommodate the diameter of the shank of the tool body against which the interior edge of the blade rests, and the other is the spiral configuration of the blade to establish the desired curvature of the cutting surface. According to the present invention there is provided an improved die set for forming the spiral curvature of a cutter blade to a predetermined shape. The die set comprises a pair of die blocks, each provided with a face, the two faces being complementary to each other and shaped to produce the predetermined spiral curvature. In addition to the faces, each die block is provided with a semicylindrical opening formed adjacent to the spiral shaped faces of the respective blocks. The semicylindrical openings are opposite each other and are adapted to receive a cylindrical insert that is complementary to and engageable with each opening in the respective die blocks. The insert is interposed between the die blocks in a manner that one-half of the insert engages the semicylindrical opening of each die block when they are in a closed position. Fastening means are used to securely fasten the cylindrical insert in engaging position with the semicylindrical opening of one of the die blocks. Therefore, when the die blocks are in an open position, the cylindrical insert will be securely held by die block, but will be positioned to engage the other block upon closure of the die set. The outside diameter of the insert conforms to the diameter of the shank of the cutting tool for which the cutter blank is being shaped. In shaping the cutter blank into a finished blade, the die set is first placed in an open position. Then a cambered blank is placed in the open die set between the spiral shaped faces in a manner that the concave edge of the cambered blank rests on the cylindrical insert. The cambered blank is then heated to a plastic state before the die set is closed to twist the blank to its predetermined shape.

The set of dies are used in conjunction with an electrical induction heating coil which is used to heat the cambered blank prior to shaping it. It is apparent that while heating the blank, the die set will also be heated by the induced electrical current. To prevent excessive heating of the die set, the dies are composed of a material that is a better conductor of heat and electricity than the cutter blank and therefore the die blocks will not be heated to a temperature as high as the cutter blank. With the die set heated to a lower temperature, upon closure the die set will serve as a quench to reduce the temperature of the blank by readily conducting heat away from the spiral shaped blade without cracking it by excessively drastic temperature changes.

The foregoing and other objects of this invention which will become more fully apparent from the following detailed description may be achieved by the particular embodiment depicted in and described in connection with the accompanying drawings, in which:

Figure 1 is a perspective view of an end mill incorporating inserted spiral cutter blades which may be formed by employing the die set of the present invention;

Fig. 2 is a perspective view of a straight, flat blank which may be formed into a spiral cutter blade in accordance with the teachings of the present invention;

Fig. 3 is a perspective view of the blank shown in Fig. 2 after it has been shaped to include the camber of the blade;

Fig. 4 is a perspective view of the blank shown in Fig. 3 with the spiral curvature of the blade added to form the completed blade;

Fig. 5 is a plan view of the blank shown in Fig. 2 disposed between the open faces of the two dies shaped to form the camber of the blade in the blank with an induction coil in position directly above the blank;

Fig. 6 is a plan view of the blank and dies shown in Fig. 5 with the induction coil removed, and the faces of the dies closed on the blank to form the camber in the blank as shown in Fig. 3;

Fig. 7 is a plan view of a cambered blank as shown in Fig. 3 disposed between the open faces of the two dies constructed in accordance with the teachings of the present invention to form the spiral curvature of the blade as shown in Fig. 4 with an induction coil in position directly above the blank;

Fig. 8 is a plan view of the blank and dies shown in Fig. 7 with the induction coil removed, and the faces of the dies closed on the blank to form the spiral curvature in the blank and thereby complete the formation of the blade shown in Fig. 4;

Fig. 9 is a view in vertical section through the pair of dies shown in Fig. 7 with the faces of the dies being in their open position for receiving a blank to be formed; and Fig. 10 is a view in side elevation of the spiral forming dies shown in Fig. 8 with the blank in position between the faces of the dies and the induction coil in position over the length of the blank for heating it prior to the forming operation.

Reference is now made more particularly to the drawings and specifically to Fig. 1 thereof illustrating a cutting tool 15 incorporating inserted sintered carbide cutter blades that may be formed into the depicted configuration by use of the die set of the present invention. The cutting tool 15 shown in Fig. 1 is an end mill for the purpose of depicting an illustrative embodiment, but it is to be understood that other types of cutting tools, as for example, shell mills, slab mills, reamers, and the like, employ curved cutting surfaces, and these blades may likewise be formed by the set of dies of the present invention.

The cutting tool 15 comprises a body 16 having a shank portion 17 which is adapted to receive a plurality of inserted carbide cutting blades 18. It will be observed from the view in Fig. 1 that the shank 17 is shaped to form flutes 19 which serve to guide the movement of the chips removed from the workpiece by the cutter blades 18. Each of the flutes 19 blend with a further curvature of the surface of the shank 17 to form a backing 21 which serves to support the blades 18 in position on the shank 17. Because of these complex configurations of the surface of the shank 17, the latter does not have a uniform diameter, but for the purposes of this description, that portion of the shank 17 against which the inner edges of the blades 18 rest will be referred to as the shank diameter and is identified by the reference numeral 20.

The blades 18 require two separate curvatures to adapt them for insertion on the cutting tool 15. One of these curvatures is called the camber, and the other is the spiral curvature of the blade. The cutting blade 18 is not parallel to the axis of the shank 17, but rather is disposed at a helical angle thereto. Therefore it is necessary that its edges be curved longitudinally to form arcuate edges which accommodate the shank diameter, and this arcuate configuration of the lengths of the blade edges is termed the camber of the blade 18. The longitudinal twist to provide the desired configuration of the cutting surface is termed the spiral curvature.

The improved method described in the above-mentioned parent patent application provides for the formation of the cutting blade 18 from a straight flat blank 25 illustrated in Fig. 2. The two curvatures of the blade are formed successively rather than simultaneously to simplify the operation and assure the accuracy of the completed blade. The camber of the cutting blade 18 is formed first, and to this end, the blank 25 is curved edgewise along its length to form arcuate edges 26 as illustrated in Fig. 3, to establish the camber of the blade for accommodating the shank diameter 20. After the parallel edges 26 have been curved to provide the camber of the blade, the cambered blank 25 is twisted along its length to form the spiral curvature which completes the formation of the blade 18 as clearly shown in Fig. 4. The dies constructed in accordance with the teachings of the present invention are particularly well adapted for forming the spiral curvature of the blade after the camber has been formed in teh blank.

The camber of the cutting blade 18 is formed in a pair of complementary camber dies 27 and 28 shaped in accordance with the desired arcuate configuration of the edges 26. The camber die 27 is provided with an arcuate face 29 which conforms to the desired curvature of the exterior edge 26, while the complementary die 28 is provided with a corresponding arcuate face 30 shaped to produce the desired curvature in the interior edge 26 of the blade 18. The blank 25 is placed between the open faces 29 and 30 of the dies 27 and 28, resting on flats 31 and 32 which are provided below the faces 29 and 30 respectively.

After the blank 25 is thus disposed between the faces 29 and 30 of the camber dies 27 and 28, an induction coil 35 is placed so that a portion of it is disposed directly above the blank 25 along the entire length of the blank between the dies 27 and 28 as illustrated in Fig. 5. The induction coil 35 is then energized with a high frequency electric current in a manner well known in the art to induce a flow of electric current into the blank 25 for the purpose of elevating its temperature sufficiently to render it plastic. Because of the relatively small cross sectional area of the blank 25, the induced current will elevate its temperature rapidly to approximately 2600° F. When this approximate temperature is reached, the camber dies 27 and 28 are actuated to close their faces against the edges of the blank 25, for shaping the blank to establish the camber of the blade 18.

By observing the color of the blank 25 as it is influenced by the induced current, it may be readily determined when its temperature has been elevated sufficiently to render it plastic, since this condition is reached when the blank becomes white hot. As soon as a white heat is observed the dies 27 and 28 are actuated to close their faces against the blank 25 for forming the camber in its edges 26. The flow of induced current in the blank 25 may be terminated immediately after the dies 27 and 28 have been actuated into their closed position, but it has been found preferable to terminate this flow of current in the blank 25 at the moment that the movement of the dies to their closed position is initiated so that the blank 25 is maintained at the elevated temperature a very minimum amount of time. By thus reducing to a minimum the time that the blank 25 is at its maximum temperature, the possibility of producing scale on its surface due to excessive oxidation is likewise reduced to a minimum.

After terminating the flow of induced current in the blank 25, it is permitted to cool sufficiently in the closed dies 27 and 28 to render it rigid. The rigid cambered blank 25 is then inserted between the open faces of a pair of dies 39 and 40 constructed in accordance with the teachings of the present invention and which are shaped to form the spiral curvature of the cutter blade 18. The dies 39 and 40 are provided with complementary faces 41 and 42 which are shaped to twist the cambered blade 25 into the desired spiral curvature to complete the formation of the cutting blade 18.

It will be noted from the view in Fig. 9 that the die 39 is provided with a semicylindrical opening 43 extending along its length directly beneath the spiral face 41, while the die 40 has an identical opening directly opposite of the opening 43 and beneath the spiral face 42. However, the semicylindrical opening in the die 40 is occupied by a cylindrical insert 45 which is secured in position by suitable screws 46. The diameter of the insert 45 conforms to the shank diameter 20 of the cutter 15 to which the cutter blade 18 is to be applied so that when the blank 25 with the camber formed therein is placed between the faces 41 and 42 of the dies 39 and 40 respectively, the blank 25 will be resting on the insert 45, in the same manner as it will be positioned on the shank of the cutter. As the faces 41 and 42 of the dies 39 and 40 are closed, the insert 45 will move into the clearance provided by the opening 43 in the die 39.

After the blank 25 is positioned on the insert 45 between the faces 41 and 42, an induction coil 47 is placed above the dies 39 and 40 as shown in Fig. 7 so that a portion of it is located directly above the top edge of the blank 25 along the entire length of the blank without contacting it. It will be noted from the view in Fig. 10 that the portion of the induction coil 47 adjacent to the blank 25 is curved to accommodate the camber of the blade. In order to obtain uniform heating of the blank 25 it has been found to be preferable to establish a somewhat sharper curvature for the induction coil 47 at the points adjacent to the ends of the blank 25 so that the induction coil 47 is closer to the ends of the blank 25 than it is to the rest of the blank. This arrangement serves to create more heat at the ends of the blank which compensates for the tendency of the ends to dissipate more heat by reason of the greater area that is exposed to air. The net result is that the entire length of the blank is brought to a uniform temperature by the operation of the induction coil 47.

After the induction coil 47 is thus positioned in relation to the blank 25, it is energized from a suitable source of high frequency electric current for the purpose of inducing a flow of electric current in the blank 25 to rapidly elevate its temperature and thereby render it plastic. As soon as a white heat is observed in the blank 25, the dies 39 and 40 are actuated to close their faces 41 and 42 against the sides of the blank 25 as shown in Fig. 8 to form the spiral curvature of the cutting blade 18. The flow of the induced current in the blank 25 may be terminated immediately after the curvature of the blade has been formed therein, although again it has been found to be preferable to terminate this flow at the same moment that the dies are being initiated in their movement to form the spiral curvature so that the blank 25 is maintained at its elevated temperature a very minimum amount of time. The blade is then allowed to cool until it becomes rigid before removing it from the dies 39 and 40. This step completes the formation of the cutter blade 18 and it is ready to be attached by brazing or other suitable means to the shank 17 of the cutter 15.

In order to efficiently carry out the above described process it is necessary that the pair of camber forming dies 27 and 28 as well as the pair of spiral forming dies 39 and 40 be fabricated of a nonferrous material that is a good conductor of both heat and electricity. An ideal material for this purpose has been found to be copper as it is an excellent conductor of both heat and electricity and is not adversely affected by the high heat to which it is subjected.

It is important that the dies 27 and 28, and the dies 39 and 40 be fabricated of a material that is a good conductor of both heat and electricity for the proper functioning of the described forming process. Good electrical conductivity is required to prevent the dies from being heated excessively by the action of the induction coils 35 and 47. The sintered carbide cutter blank 25 offers a relatively high resistance to the flow of electrical current therein and is therefore heated rapidly to the desired temperature in a matter of moments. By employing a superior electrical conductor for the dies which form the cutter blade 18, the electricity induced therein by the induction coils 35 and 47 will flow through the material without encountering as much resistance so that the temperature of the die faces will not approach the maximum temperature of the blank 25. On the other hand, some heating of the surfaces of the faces of the dies does occur by reason of the induced current from the coils 35 and 47, and by radiation from the heated blank 25, but this temperature is substantially below the maximum temperature of the blank 25. Such slight heating of the die faces is desirable in order to avoid an excessively drastic reduction in the temperature of the blank 25 as it is contacted by the die faces since an excessively rapid change in temperature might possibly cause it to crack.

Good heat conductivity is another property of the die material which is desirable for the purpose of carrying away the heat from the blank 25 when it is contacted by the dies so that it becomes rigid immediately after it is formed. Although a drastic temperature differential between the heated blank 25 and its cooperating dies is to be avoided because of the tendency for the blank to crack when contacted by surfaces of much lower temperatures, it is desirable to cool the blank rapidly to a temperature below that at which it becomes plastic in order to avoid oxidation of its surfaces. Thus, by employing copper dies or dies fabricated of a material having similar characteristics in respect to electrical and heat conductivity, a drastic temperature differential in the heated blank and the faces of the dies is avoided so that the cracking of the workpiece is prevented. However, the blank is rapidly brought down from the high temperature at which it is formed, to a lower temperature at which the material is no longer plastic but is in its rigid condition even though it is not cooled excessively. Under these ideal conditions, the blank 25 is accurately formed by dies while in its plastic condition, but it is maintained in this condition a very minimum amount of time so that a minimum oxidation of its surface occurs without the formation of any scale.

It is apparent that there is very little opportunity for the surfaces of the cutter blade 18 to oxidize when it is formed in accordance with the above described process, inasmuch as it is retained in its plastic condition at the maximum temperature for only a moment. As soon as the blank 25 is heated to the required temperature, the dies are actuated and at the same time the flow of induced electric current in the blank 25 may be terminated. When the blank 25 comes into contact with the cooler surfaces of the faces of the dies some of the heat from the blank is immediately transmitted from the blank 25 so that its temperature is lowered, but not to an extremely low temperature as would occur if it were quenched in a cold liquid medium. Instead, the temperature is brought down rapidly to a point below that at which the blank is plastic where oxidation of its surface is not apt to occur by contact with the cooler faces of the dies, and then is cooled further from this temperature at a much slower rate.

From the foregoing description of an illustrative application of the teachings of the present invention, it will be apparent that there has been provided an improved set of dies for forming cutter blades which is especially adapted for forming spiral sintered carbide cutter blades with improved accuracy without the formation of scale on the surfaces of the blades.

Although the illustrative embodiment of the invention herein set forth has been described in considerable detail to make a full disclosure of the invention, it is to be understood that the particular structure described is intended to be illustrative only, and that the various features of the invention may be incorporated in other forms without departing from the spirit and scope of the invention as defined in the subjoined claims.

The principles of this invention having now been fully explained in connection with the foregoing description, we hereby claim as our invention:

1. In a set of dies for forming a spiral curvature in a cutter blade to be inserted in the shank of a cutting tool, a first die block having a semicylindrical recess extending longitudinally along one side; a spiral shaped face formed directly above said recess in said first die block, a second die block having a semicylindrical recess extending longitudinally along one side, a spiral shaped face formed directly above said recess in said second die block and complementary to the spiral shaped face in said first die block for mutual cooperation to form the spiral curvature in the cutter blade; and a cylindrical insert fixed in the semicylindrical recess of said second die block, said insert having a diameter conforming to the shank diameter of the cutter in which the cutter blade is to be inserted; whereby a cambered blank may be placed on said cylindrical insert to position it for operation upon by the complementary spiral faces of said die blocks to form the spiral curvature of the cutter blade, and the insert will move into the recess of said first die block when the faces of the die blocks are closed to form the spiral curvature in the blade.

2. In a set of dies for forming a spiral curvature in a cutter blade that is to be inserted on the shank of a cutting tool; a first die block having a recess extending longitudinally along one side; a spiral shaped face formed directly above said recess in said first die block; a second die block; an insert fixed to said second die block and presenting an arcuate surface of a radius conforming to the radius of the shank diameter of the cutter on which the cutter blade is to be inserted to accommodate the camber of the blade in which the spiral curvature is to be formed; and a spiral shaped face formed directly above said insert in said second die block and complementary to the spiral shaped face in said first die block for mutual cooperation to form the spiral curvature in the cutter blade; whereby a cambered blank may be placed on the arcuate surface of said insert to position it for operation upon by the complementary spiral faces of said die blocks to form the spiral curvature of the cutter blade, and the insert will move into the clearance provided by the recess of said first die block when the faces of the die blocks are closed to form the spiral curvature in the blade.

3. In a set of dies for forming a curvature in a cutter blade blank that has been provided with a camber; a first die block; a curved face formed on said first die block; a second die block; a curved face formed on said second die block complementary to the curved face formed on said first die block for mutual cooperation to form the curvature in the cutter blade; and an arcuate surface of a radius conforming to the camber formed in the blank, said arcuate surface being formed on said second die block in position to be engaged by the cambered surface of the blank to support the blank between said curved faces before said faces are closed to form the curvature in the blank; whereby a cambered blank may be placed on said arcuate surface to position it for operation upon by said curved faces to form the curvature of the cutter blade with uniform accuracy in proper relationship to the camber.

4. In a set of dies for forming a curvature in a cutter blade blank that has been provided with a camber; a first die block; a curved face formed on said first die block; a second die block; a curved face formed on said second die block complementary to the curved face formed on said first die block for mutual cooperation to form the curvature in the cutter blade; and means on one of said die blocks to be engaged by the camber in the blank to support the blank between said curved faces before said faces are closed to form the curvature in the blank, said support means presenting a curved surface to accommodate the camber formed in the blank; whereby the curvature will be formed in the cutter blade with uniform accuracy in proper relationship to the camber.

5. In a set of dies for forming a second curvature in a blank that has been provided with a first curvature; a first die block; a face formed on said first die block, said face having a configuration conforming to the second curvature to be formed in the blank; a second die block; a face formed on said second die block and having a configuration complementary to the face formed on said first die block for mutual cooperation to form the second curvature in the blank; and means arranged to support a blank between said faces before said faces are closed to form the second curvature in the blank, said support means presenting a curved surface to accommodate the first curvature formed in the blank; whereby the second curvature will be formed in the blanks with uniform accuracy in proper relationship to the first curvature.

6. In a set of dies for forming a curvature in a cutter blade blank that has been provided with a camber; a first die block; a curved face formed on said first die block; a second die block; a curved face formed on said second die block complementary to the curved face formed on said first die block for mutual cooperation to form the curvature in the cutter blade; means arranged to support a cambered blank between said curved faces before said faces are closed to form the curvature in the blank, said support means presenting a curved surface to accommodate the camber formed in the blank; and an induction coil adapted to be supported adjacent to a blank on said support means to heat the blank when energized and thereby render the blank plastic for operation upon by said faces to form the curvature in the blank; whereby the curvature will be formed in the cutter blade with uniform accuracy in proper relationship to the camber.

7. In a set of dies for forming a second curvature in a blank that has been provided with a first curvature; a pair of die blocks of a material that is a better conductor of electricity than is the material from which the blanks are formed; a face formed on the first of said pair of die blocks, said face having a configuration conforming to the second curvature to be formed in the blank; a face formed on the second of said pair of die blocks and having a configuration complementary to the face formed on said first die block for mutual cooperation to form the second curvature in the blank; and means arranged to be engaged by the first curvature in a blank to support the blank between said faces before said faces are closed to form the second curvature in the blank, said support means presenting a curved surface to accommodate the first curvature formed in the blank; whereby the second curvature will be formed in the blanks with uniform accuracy in proper relationship to the first curvature.

8. In a set of dies for forming a second curvature in a blank that has been provided with a first curvature; a pair of die blocks formed of a material that is a better conductor of electricity than is the material from which the blanks are formed; a face formed on the first of said pair of die blocks, said face having a configuration conforming to the second curvature to be formed in the blank; a face formed on the second of said pair of die blocks and having a configuration complementary to the face formed on said first die block for mutual cooperation to form the second curvature in the blank; means arranged to be engaged by the first curvature in a blank to support the blank between said faces before said faces are closed to form the second curvature in the blank, said support means presenting a curved surface to accommodate the first curvature formed in the blank; and an induction coil adapted to be supported adjacent to a blank on said support means to heat the blank when energized and thereby rended the blank plastic for operation upon by said faces to form the second curvature in the blank, said induction coil being bowed so that it will be closer to the ends of the blank than to the intermediate portion of the blank to more uniformly heat the blank; whereby the second curvature will be formed in the blanks with uniform accuracy in proper relationship to the first curvature.

9. In a set of dies for forming a curvature in a sintered carbide cutter blade blank that has been provided with a camber; a pair of die blocks formed of a material that is a better conductor of electricity than is the sintered carbide from which the blanks are formed so that the die blocks will remain cooler than the blank when an electric current is induced into a blank supported by the die blocks; a curved face formed on the first of said pair of die blocks; a curved face formed on the second of said pair of die blocks and having a configuration complementary to the face formed on said first die block for mutual cooperation to form the curvature in the cutter blade; and an arcuate surface of a radius conforming to the camber formed in the blank, said arcuate radius being formed on one of said pair of die blocks in position to be engaged by the cambered surface of the blank to support the blank between said curved faces before said faces are closed to form the curvature in the blank; whereby a cambered blank may be placed on said arcuate surface to position it for operation upon by said curved faces to form the curvature of the cutter blade with uniform accuracy in proper relationship to the camber.

References Cited in the file of this patent

UNITED STATES PATENTS

| | | |
|---|---|---|
| 340,024 | Williams | Apr. 13, 1886 |
| 2,903,569 | Davis et al. | Sept. 8, 1959 |